United States Patent

[11] 3,545,773

[72] Inventor Stephen J. Smith
        Woodland Hills, California
[21] Appl. No. 793,319
[22] Filed Jan. 23, 1969
[45] Patented Dec. 8, 1970
[73] Assignee Smith-Schreyer & Assoc., Inc.
        a corporation of California

[54] END SEAL FOR SPLICE CASE
    5 Claims, 9 Drawing Figs.
[52] U.S. Cl. .................................................. 277/199,
        174/77, 174/92
[51] Int. Cl. .................................................. F16k 41/00
[50] Field of Search ......................................... 277/4, 66,
        154, 199; 174/92, 93, 77, 226

[56] References Cited
    UNITED STATES PATENTS
2,968,505  1/1961  Scaramucci .................. 277/199

| | | | |
|---|---|---|---|
| 3,076,655 | 2/1963 | Washburn ................... | 277/66X |
| 3,233,035 | 2/1966 | Black ........................... | 174/93 |
| 3,240,502 | 3/1966 | Snyder ........................ | 277/66X |
| 3,337,681 | 8/1967 | Smith .......................... | 277/226X |
| 3,466,384 | 9/1969 | Martin ......................... | 174/92 |

Primary Examiner—Laverne D. Geiger
Assistant Examiner—Robert I. Smith
Attorney—Lyon & Lyon ABSTRACT: An end seal for a splice case for protecting cable in which an end piece comprising a shell of rigid plastic filled with foamed plastic material has a channel cut therethrough for receiving a cable. The channel is covered with a strip of sealing material, the cable laid in place, the cable covered with a second strip of sealing material, and a mating end piece positioned over the cable.

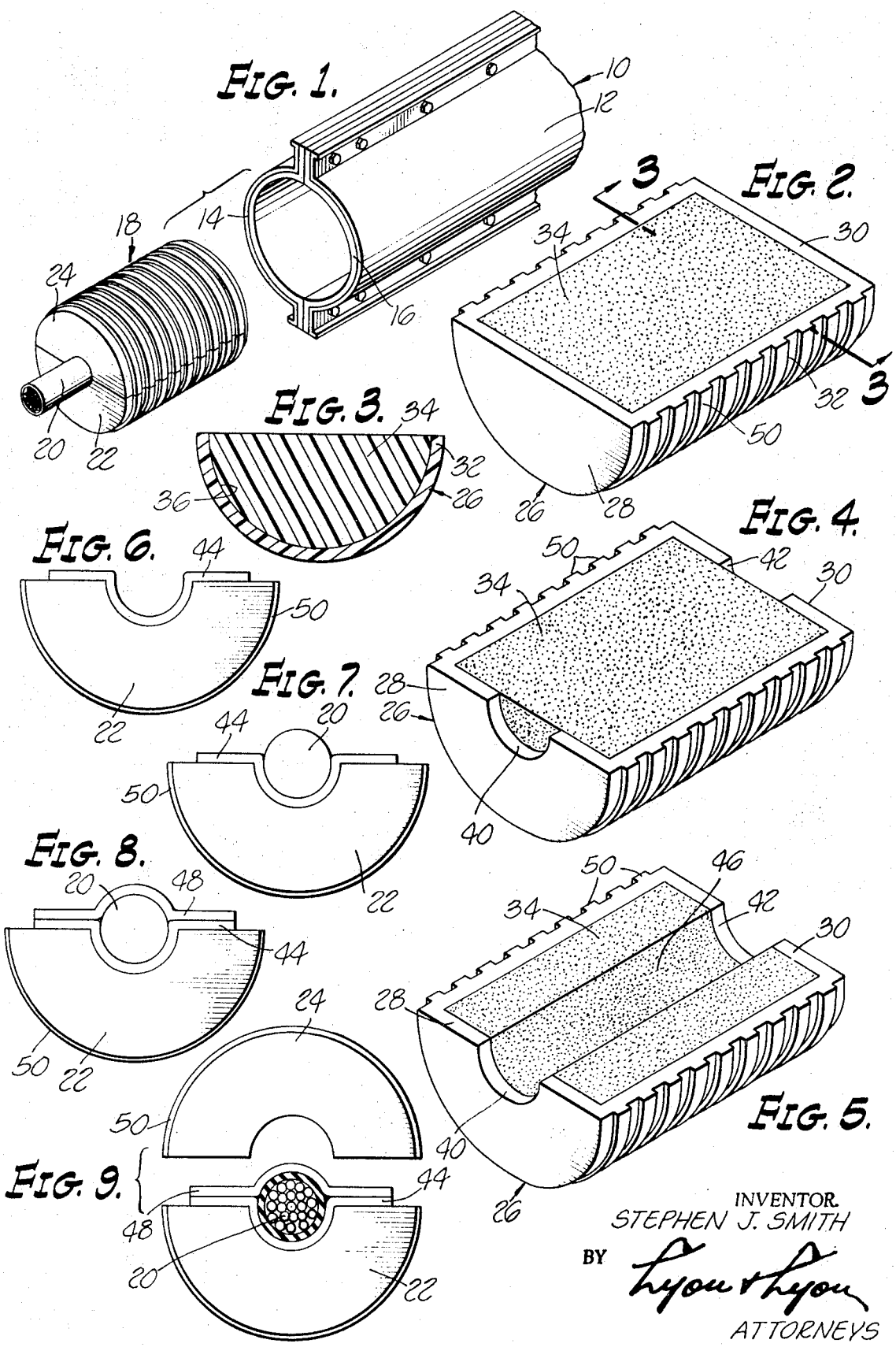

END SEAL FOR SPLICE CASE

BACKGROUND OF THE INVENTION

In U.S. Pat. No. 3,337,681 there is disclosed a splice case for use in protecting spliced cables from corrosion and the like. The details of such a splice case are fully set forth in the aforementioned patent, the disclosure of which is incorporated by reference herein. Briefly, the splice case comprises a pair of semicircular tubular members having longitudinal flanges which are bolted together to assemble the case. Each end of the case is provided with an end seal having passageways therethrough to pass the cables from the interior to the exterior of the case.

The end seals disclosed in the Smith patent are each constructed of a pair of mating semicircular members or end pieces fabricated of a hard plastic and molded so as to be provided with two longitudinal cavities. In installing the end seal, the workman cuts away the walls of each of the two mating end pieces to form openings approximately one-half the size of the cable. The workman then wraps a mastic tape around the cable until the roll of mastic tape is larger than the cavities in the end pieces. The latter are then pressed together to form a snug fit around the cables and the tape.

While the end seals disclosed in the Smith patent are quite satisfactory once they have been installed, the installation process itself is rather time-consuming and requires a certain amount of skill from the workman. The wrapping of the mastic tape takes considerable time and the proper amount must be accurately judged so that the outermost wrap makes good sealing contact with the cavities in the end pieces and yet does not prevent the end pieces from coming snugly together. In addition, the size and number of cables that can be handled by the end seals is restricted by the size and number of the cavities molded into the end pieces.

SUMMARY OF THE INVENTION

According to the present invention, an end seal for a splice case is provided which is simple and quick to install and which requires very little skill. The end pieces of the end seal of the present invention are each made up of a semicircular hollow shell filled with a foamed plastic which itself is impervious to the passage of air. In order to install these end pieces, the workman first cuts the hard plastic of the shell of each mating half to a size substantially equal to half the size of the cable or cables to be sealed and then, guided by the holes in the hard plastic, cuts away the foamed plastic filler. A strip of mastic or other sealing material is then placed over the foamed material, the cable laid in place, and another strip of mastic placed over the cable. The mating end piece is then forced into place, completing the seal about the cable. Since the end piece shell is not provided with any internal structure, one or several cables of many varying diameters can be handled by a single end piece, assuming, of course, that their combined diameters do not exceed the diameter of the end piece.

It is therefore an object of the present invention to provide an improved end seal for a splice case.

It is also an object of the present invention to provide a method for installing a cable in an end seal for a splice case.

These and other objects and advantages of the present invention will become more apparent upon reference to the accompanying description and drawings in which:

BRIEF DESCRIPTION OF THE DRAWINGS

FIG. 1 is a perspective view of a splice case such as that disclosed in the aforementioned Smith patent;

FIG. 2 is a perspective view of an end piece according to the present invention;

FIG. 3 is a cross-sectional view taken along lines 3–3 of FIG. 2;

FIG. 4 is a perspective view of the end piece after the outer plastic shell has been cut;

FIG. 5 is a perspective view of the end piece after the foamed filler material has been cut away; and FIGS. 6, 7, 8 and 9 show successive steps in the installation of the end seal around a cable.

DESCRIPTION OF THE INVENTION

FIG. 1 shows a splice case 10 such as that disclosed in the aforementioned Smith patent. As can be seen, the splice case is constructed of two elongated semicylindrical members 12 and 14 which are each provided with upper and lower flanges which are bolted together to form the completed tubular member. The inner surface of the case is lined with a layer 16 of soft inert plastic such as neoprene. An end seal 18 is provided for being received in the end of the splice case 10 and serve to pass a cable 20 from the interior of the splice case to the exterior. It is the construction of such an end seal and the manner in which it is installed which constitute the subject matter of the present invention.

As can be seen from FIG. 1, the end seal 18 is composed of two mating end pieces 22 and 24. The construction of such an end piece and the manner in which the two end pieces are used together are shown in FIGS. 2 through 9. The end piece comprises an outer hollow shell 26 which is semicylindrical in configuration and has end walls 28 and 30 and a peripheral wall 32. The shell 26 is preferably constructed of a hard plastic material such as polyethylene, polypropylene or polystyrene.

The interior of the shell 26 is filled with a body of foamed plastic 34 such as styrofoam. As shown in FIG. 3, the foamed plastic 34 is preferably bonded to the inner surface of the shell 26 by a suitable adhesive 36. The plastic filler 34 can be either cut to shape and then inserted into and bonded to the shell 26 or it may be foamed in place within the shell 26. In the latter case, it may not be necessary to use the adhesive 36.

The end piece shown in FIG. 2 is what is actually taken into the field by the telephone lineman or other worker. After the size of the cable to be sealed is determined, the lineman cuts away appropriate size pieces of the end walls 28 and 30 to form arcuate openings 40 and 42 therein which are approximately the proper size to receive one-half of the cable. The cutting of the end walls 28 and 30 of the shell 26 can be accomplished by using a circular cutter or other similar tool.

After the end walls 28 and 30 are cut, the lineman uses the boundaries of the openings 40 and 42 to guide any suitable saw, knife or other tool to cut the filler plastic foam 34. For this purpose, the filler foam must be easily cutable in sections. The resultant structure is shown in FIG. 5.

The workman next lays a strip 44 of mastic or other suitable sealing material across the upper surface of the end piece 22 so that it enters into, and follows the contours, of the channel 46 formed in the filler material 34 and extends over the filler on both sides of the channel 46. The cable 20 is then laid in place over the mastic 44 and another strip 48 of mastic placed over the cable 20. The strip 48 of mastic should be long enough so that it makes substantial contact at each end with the strip 44. The other end piece 24 is then positioned over the assembly and the two end pieces 22 and 24 are brought firmly together, causing the mastic strips 44 and 48 to flow and make a complete seal around the cable 20. The completed end seal 18 can then be inserted into the splice case 10.

Preferably, the peripheral wall 32 of the end pieces 22 and 24 are provided with ridges 50 such as those disclosed in the Smith patent for the same purposes.

From the foregoing, it can be seen that an end seal for a splice case has been provided which is simple and quick to install and which requires relatively little skill to install. No time-consuming wrapping of mastic tape at the point of installation is required and a good seal is assured even if the channel cut into the end pieces is not exactly the right size because of the ability of the mastic to flow and seal any spaces that are left. It should be understood that while the end seal illustrated passes only a single cable, it is capable of passing a plurality of cables and for it to do so requires only that the corresponding number of channels be cut into the end pieces. It should also be obvious that the end seal is capable of handling cables having different diameters, the maximum diameter being limited only by the dimensions of the shell 26.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An end seal comprising:
a pair of mating end pieces, each of said end pieces comprising a hollow shell member filled with a body of cutable foamed material impervious to air, a channel being formed in said shell members and said body of foamed materials; said channel being adaptable to receive a cable;
a strip of sealing material positioned over the channel in one of said end pieces, said cable being received in said channel over said strip of sealing material;
a second strip of sealing material placed over said cable and engaging said first strip of sealing material; and
said end pieces being brought into abutting relationship.

2. A method of installing a pair of mating, foam-filled end pieces around a cable to form an end seal for a splice case to contain said cable comprising:
forming a channel in each of said end pieces to receive said cable;
positioning a strip of sealing material over said channel in one of said end pieces;
positioning said cable in said channel over said strip of sealing material;
positioning a second strip of sealing material over said cable, said second strip of sealing material engaging said first strip of sealing material; and
bringing said other end piece into abutting relationship with said one end piece, the channel in said other end piece receiving said second strip of mastic and a portion of said cable.

3. An end piece for use in constructing an end seal for a splice case comprising a semicylindrical hollow shell of hard plastic material, said shell having end walls and a peripheral wall forming an open upper surface; and a body of cutable foamed plastic material impervious to air positioned within said shell and bonded to the walls thereof, the upper surface of said body of foamed material being substantially flush with the upper surfaces of said walls of said shell.

4. The end piece of claim 3 wherein said body of foamed material is foamed in place within said shell.

5. The end piece of claim 3 wherein said body of foamed material is preformed and bonded in position by a layer of adhesive material.